(12) United States Patent
Sha et al.

(10) Patent No.: US 11,346,469 B2
(45) Date of Patent: May 31, 2022

(54) NON-PENETRATING MULTI-LAYER CONTINUOUS HOSE AND A PREPARATION METHOD THEREOF

(71) Applicant: 5ELEM HI-TECH CORPORATION, Taizhou (CN)

(72) Inventors: Yuehua Sha, Taizhou (CN); Chundong Gu, Taizhou (CN); Donghui Wang, Taizhou (CN); Wenlin Sha, Taizhou (CN); Zhiyong Sha, Taizhou (CN)

(73) Assignee: 5ELEM HI-TECH CORPORATION, Taizhou (CN)

( * ) Notice: Subject to any disclaimer, the term of this patent is extended or adjusted under 35 U.S.C. 154(b) by 1 day.

(21) Appl. No.: 16/954,570

(22) PCT Filed: Jan. 9, 2018

(86) PCT No.: PCT/CN2018/071908
§ 371 (c)(1),
(2) Date: Jun. 17, 2020

(87) PCT Pub. No.: WO2019/119543
PCT Pub. Date: Jun. 27, 2019

(65) Prior Publication Data
US 2020/0332925 A1    Oct. 22, 2020

(30) Foreign Application Priority Data
Dec. 20, 2017    (CN) .......................... 201711386642.X

(51) Int. Cl.
*F16L 11/08*    (2006.01)
*B32B 1/08*    (2006.01)
(Continued)

(52) U.S. Cl.
CPC .......... *F16L 11/08* (2013.01); *B29C 48/0022* (2019.02); *B29C 48/09* (2019.02);
(Continued)

(58) Field of Classification Search
CPC ........... B32B 1/08; B32B 5/024; B32B 27/06; B32B 27/12; B32B 27/32; B32B 27/34;
(Continued)

(56) References Cited

U.S. PATENT DOCUMENTS 6,062,269 A  *  5/2000  Tanaka .................. F16L 11/085
                                                       138/126

FOREIGN PATENT DOCUMENTS

| CN | 102449369 A | 5/2012 |
|---|---|---|
| CN | 105371015 A | 3/2016 |

(Continued)

*Primary Examiner* — Walter Aughenbaugh
(74) *Attorney, Agent, or Firm* — Bayramoglu Law Offices LLC

(57) ABSTRACT

A non-penetrating multi-layer continuous hose and a preparation method thereof are provided. The hose includes an outer coating, a reinforcement layer, and an inner coating. The inner coating and the outer coating can have one or more layers with different materials and have an adjustable thickness. The hose is prepared by simultaneously performing extrusion coating inside and outside the reinforcement layer rather than penetrating the fiber reinforcement layer. The hose exhibits improved layer-to-layer adhesion and has high strength, and continuous production can be achieved to meet the length requirement in various kinds of construction, which has high applicability.

6 Claims, 3 Drawing Sheets

(51) Int. Cl.
    *B29C 48/00*     (2019.01)
    *B29C 48/09*     (2019.01)
    *B29C 48/88*     (2019.01)
    *B29C 48/21*     (2019.01)
    *B32B 5/02*     (2006.01)
    *B32B 27/06*     (2006.01)
    *B32B 27/12*     (2006.01)
    *B32B 27/32*     (2006.01)
    *B32B 27/34*     (2006.01)
    *B32B 27/40*     (2006.01)
    *B32B 39/00*     (2006.01)
    *B29K 77/00*     (2006.01)
    *B29K 267/00*     (2006.01)
    *B29L 23/00*     (2006.01)
(52) U.S. Cl.
    CPC .......... *B29C 48/21* (2019.02); *B29C 48/9115* (2019.02); *B32B 1/08* (2013.01); *B32B 5/024* (2013.01); *B32B 27/06* (2013.01); *B32B 27/12* (2013.01); *B32B 27/32* (2013.01); *B32B 27/34* (2013.01); *B32B 27/40* (2013.01); *B32B 39/00* (2013.01); *B29K 2023/06* (2013.01); *B29K 2077/00* (2013.01); *B29K 2267/00* (2013.01); *B29L 2023/005* (2013.01); *B32B 2250/40* (2013.01); *B32B 2255/02* (2013.01); *B32B 2255/26* (2013.01); *B32B 2262/0269* (2013.01); *B32B 2262/0276* (2013.01); *B32B 2597/00* (2013.01)

(58) Field of Classification Search
    CPC . B32B 27/40; B32B 2250/40; B32B 2255/26; B32B 2262/0269; B32B 2262/0276; B32B 2597/00; B29C 48/0022; B29C 48/09; B29C 48/9115; B29C 48/21; B29K 2023/06; B29K 2077/00; B29K 2267/00; B29L 2023/005; F16L 11/08; F16L 11/082; F16L 11/085
    See application file for complete search history.

(56) References Cited

FOREIGN PATENT DOCUMENTS

| | | |
|---|---|---|
| CN | 105437576 A | 3/2016 |
| CN | 106117639 A | 11/2016 |
| CN | 106907536 A | 6/2017 |
| CN | 106945314 A | 7/2017 |
| CN | 207657131 U | 7/2018 |
| CN | 207661248 U | 7/2018 |
| JP | 2005265185 A | 9/2005 |

* cited by examiner

NON-PENETRATING MULTI-LAYER CONTINUOUS HOSE AND A PREPARATION METHOD THEREOF

CROSS REFERENCE TO THE RELATED APPLICATIONS

This application is the national phase entry of International Application No. PCT/CN2018/071908, filed on Jan. 9, 2018, which is based upon and claims priority to Chinese Patent Application No. 201711386642.X, filed on Dec. 20, 2017, the entire contents of which are incorporated herein by reference.

TECHNICAL FIELD

The present invention belongs to the application field of thermoplastic elastomers, and more particularly, relates to a non-penetrating multi-layer continuous hose and a preparation method thereof.

BACKGROUND

Multi-layer non-penetrating long-distance hoses have the advantages of being convenient in laying, using, and storing with less space occupation, and thus are widely used in the petroleum industry, municipal engineering, industrial engineering, and other fields. Besides, when used to pipe liners, multi-layer non-penetrating long-distance hoses exhibit significant superiority in terms of protection, service life extension and quick repair. In municipal engineering, multi-layer non-penetrating long-distance hoses can be employed to quickly handle urban waterlogging, environmental pollution, and waste of water resources caused by pipe damage. In this way, construction can be implemented at a low cost without an overall excavation and influences upon the buildings and roads above the pipelines and other cross pipelines. When used in industrial pipelines, multi-layer non-penetrating long-distance hoses can employ non-metallic protective layers to be resistant to metal corrosion, which significantly contributes to the lining protection in new pipelines and the repair of old pipelines. Moreover, multi-layer long-distance hoses, when meeting the requirements in specific industry applications, can reduce the production cost and increase the operational performance, and thus have promising application prospects.

Conventional hoses, however, have problems such as having complicated manufacturing processes, same materials for the inner coating and the outer coating, and limitations on the length, and requiring a highly exact turning angle when used as lining repair pipes, which severely affects the practical application of hoses. Therefore, it is imperative to develop a simple and convenient method for preparing a multi-functional long-distance hose with different materials for the inner coating and the outer coating and an adjustable length.

SUMMARY

In order to solve the above-mentioned problems, the present invention provides a non-penetrating multi-layer continuous hose and a preparation method thereof. The hose is produced by simultaneously performing extrusion coating inside and outside the reinforcement layer via a non-penetrating production process. The inner coating and the outer coating have different materials with adjustable thickness. The hose has good adhesion between layers, high strength and wide application range.

To achieve the above-mentioned objectives, the present invention adopts the following technical solution:

A non-penetrating multi-layer continuous hose includes an outer coating, a reinforcement layer, and an inner coating. The reinforcement layer is a tubular layer woven by warp and weft. The outer coating is arranged on the outside of the reinforcement layer, and the inner coating is arranged on the inside of the reinforcement layer. The outer coating and the inner coating have different materials with adjustable thickness.

As an improvement of the present invention, the reinforcement layer includes one or two layers. The outer coating and the inner coating both include one or more layers.

As an improvement of the present invention, the material of the inner coating is thermoplastic polyurethane (TPU) or other polymer materials, and the material of the outer coating is flexible polyethylene (PE), polyamides (PA) or other polymer materials.

As an improvement of the present invention, the reinforcement layer is a polyester fiber layer, or an aramid fiber layer or other high-strength fiber layers.

A method for preparing a non-penetrating multi-layer continuous hose includes the following steps:

(1) activating a circular loom to weave a reinforcement layer;

(2) feeding the reinforcement layer into a traction system, activating a traction machine, activating an upper extruder of an inner layer and a lower extruder of an outer layer after a steady cycle, passing the reinforcement layer through an extrusion mold along the length direction to coat the inner layer and the outer layer, and adjusting an extrusion speed of the upper extruder and the lower extruder and a traction speed of the traction machine, respectively, to obtain the required thickness of the inner layer and the outer layer; and (3) after the hose is formed, shaping the hose by a cooling spray device, and cutting the hose to an appropriate length as required.

An apparatus for preparing the non-penetrating multi-layer continuous hose includes a circular loom, a new-type traction system, an upper extruder, a lower extruder, a combination module, a cooling spray device, a traction machine, and a winding machine. The circular loom is arranged between the upper extruder and the lower extruder. The new-type traction system is arranged under the circular loom. The new-type traction system includes a guide tube and a guide piece. The guide piece is arranged inside the guide tube. The inner wall of the guide tube is provided with a far infrared heater. The combination module is arranged below the guide tube. The combination module is provided with a reinforcement layer inlet, an outer layer material inlet and a lining material inlet. The reinforcement layer inlet is arranged between the outer layer material inlet and the lining material inlet. The lining material inlet is connected to the upper extruder, and the outer layer material inlet is connected to the lower extruder. There is a reserved space between the traction roller and the extrusion mold. The cooling spray device is arranged under the new-type traction system. The rear end of the cooling spray device is connected to the traction machine and the winding machine.

The advantages of the present invention are as follows:

The present invention provides a non-penetrating multi-layer continuous hose and a preparation method thereof. The inner coating and the outer coating can include one or more layers of different materials with adjustable thickness. Moreover, the extrusion coating is simultaneously performed inside and outside the reinforcement layer, so that the hose has good adhesion between layers and high strength, continuous production can be achieved to meet the length requirements of various kinds of construction, which has high applicability. No coating material exits in the middle of the fabric reinforcement, so that the hose requires a less exact turning angle when used as a lining repair pipe, and thus can be applied to various corresponding applications such as drinking water, water supply and drainage, petrochemical industry and other high-temperature media.

Figure 1:
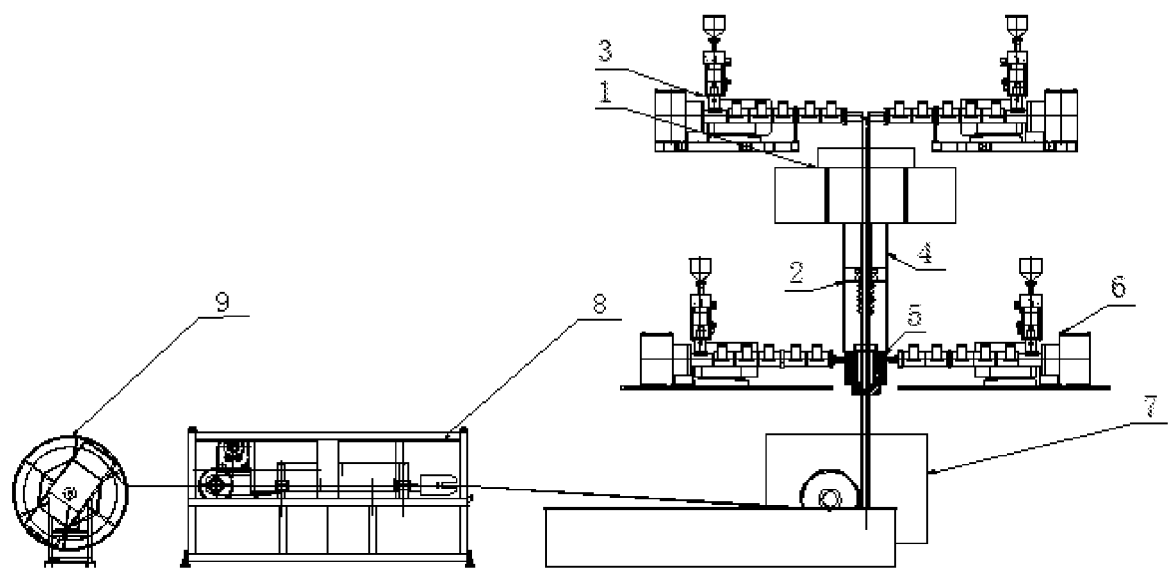
FIG. 1 is a schematic diagram showing the apparatus of the present invention.

In the figures:
1-circular loom, 2-new-type traction system, 3-upper extruder, 4-far infrared heater, 5-combination module, 6-lower extruder, 7-cooling spray device, 8-traction machine, 9-winding machine, 11-outer layer material inlet, 12-reinforcement layer inlet, 13-lining material inlet, 14-guide tube, 15-guide piece, 16-reserved space, 17-outer coating, 18-reinforcement layer, 19-inner coating.

DETAILED DESCRIPTION OF THE EMBODIMENTS

The present invention is further illustrated hereinafter with reference to the embodiments and drawing. It should be understood that the embodiments are only intended to describe the present invention, rather than to limit the scope of the present invention. It should be noted that the terminologies "front", "rear", "left", "right", "upper" and "lower" used in the following descriptions refer to the direction in the drawings, and the terminologies "inside" and "outside" refer to the direction facing or away from the geometric center of a specific component, respectively.

Figure 2:
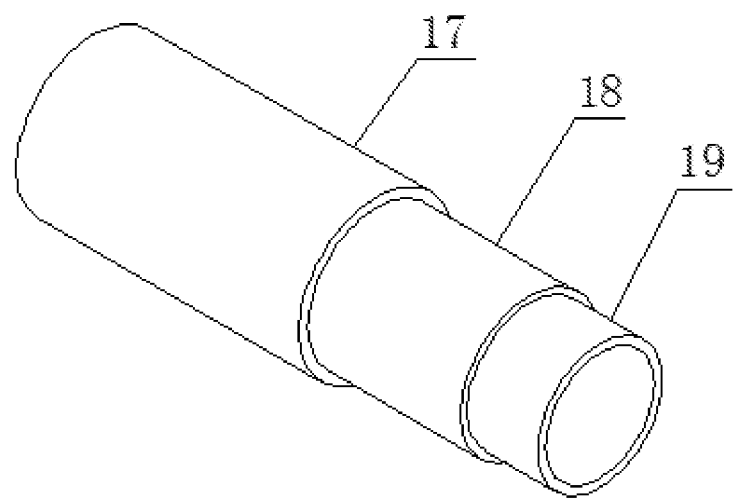
FIG. 2 is a cross-sectional view of the processed hose of the present invention.
Figure 3:
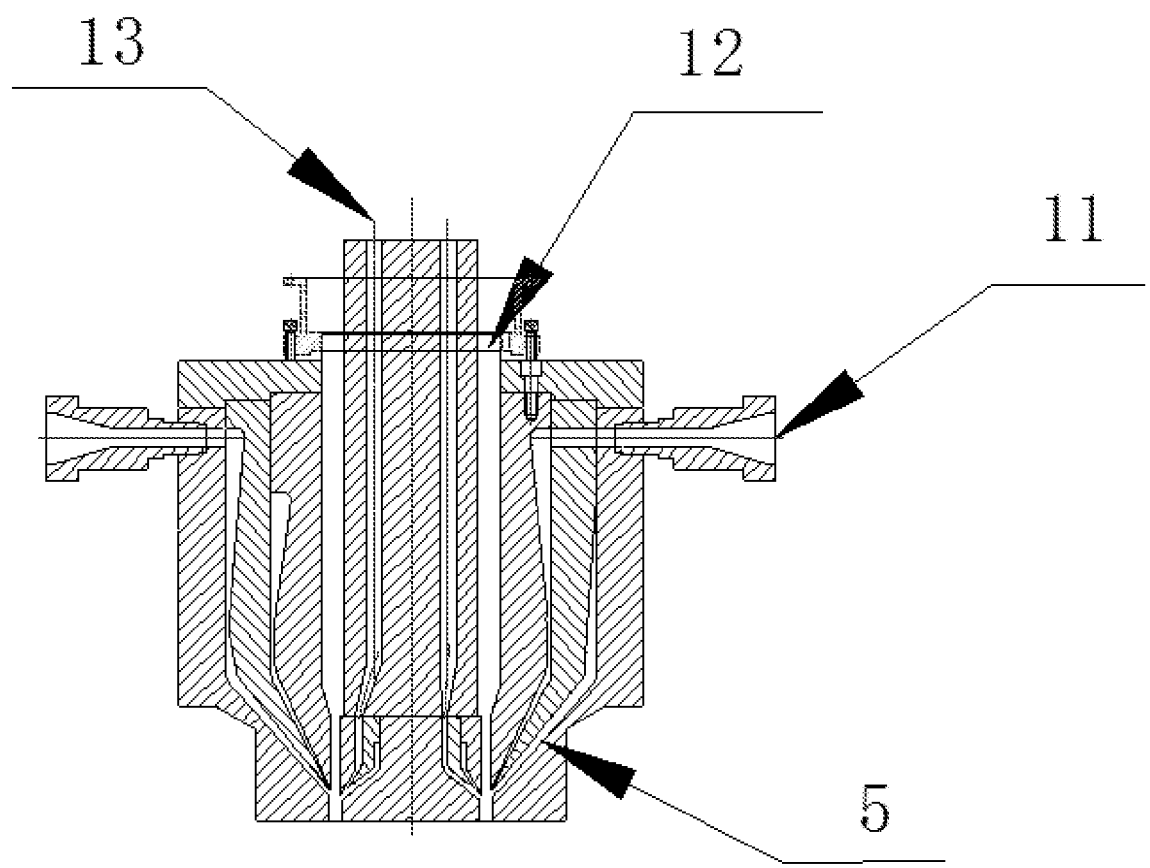
FIG. 3 is a schematic diagram showing the extrusion mold of the present invention.
Figure 4:
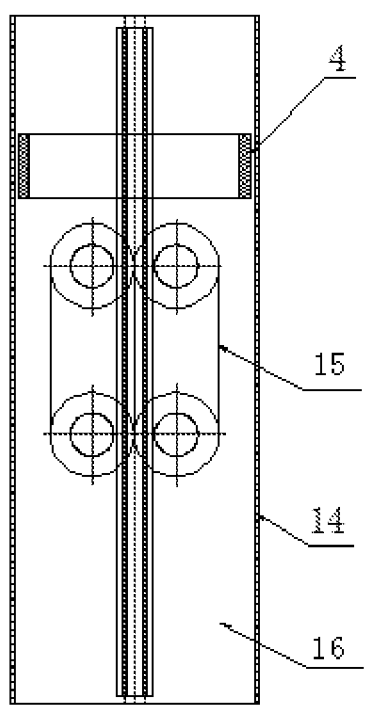
FIG. 4 is a schematic diagram showing the new-type traction system of the present invention.

As shown in FIGS. 1-4, the present invention provides a non-penetrating multi-layer continuous hose produced by simultaneously performing extrusion coating inside and outside the reinforcement layer. The inner coating 19 is directly extruded from the inside to coat the reinforcement layer without penetrating the reinforcement layer. The outside of the reinforcement layer is coated by the outer coating, and no coating material exits inside the reinforcement layer. The inner coating and the outer coating can have one or more layers according to the requirements, and the materials of the inner coating and the outer coating can be TPU, flexible PE, PA or other polymer materials. The reinforcement layer is generally a polyester fiber layer, an aramid fiber layer or other high-strength fiber layers. Besides, the inner coating does not need to penetrate the fiber reinforcement layer, so that the fiber reinforcement layer can be woven with one or two layers to increase the strength of the hose and broaden the application range.

Embodiment 1

A method for preparing a high-flow emergency drinking water hose (TPU material) includes the following steps:

(1) Drying, color blending, and mixing of the outer coating: The outer coating granular material (Lubrizol 58315-036) and the color master batch (TEKNOR APEX-MBB1401) in the ratio of (100:(0-5)) are mixed in a mixer, and then fed into a dryer and dried at 70-110° C. for 1-6 hours. The above raw materials do not need to meet the drinking water standard.

(2) The inner coating granular material (BASF 1185A-10000) is employed to meet the drinking water standard and is fed into the dryer and dried at 70-110° C. for 1-6 hours.

(3) Preparation of the reinforcement layer: The fiber layer process is designed, the reinforcement fibers are prepared, and the circular loom is tested for commissioning.

(4) Preparation of the mold: The extrusion mold is prepared according to the diameter of the non-penetrating multi-layer continuous hose and heated to a predetermined temperature of 170-210° C. The inner layer and the outer layer of the mold can extrude one or more kinds of materials, respectively.

(5) Preparation for the extruder: The upper and lower extruder system performs preheating at a temperature of 130-210° C. for the next step.

(6) Preparation of the finished product: The circular loom 1 is activated to weave the reinforcement layer 18, and the reinforcement layer 18 is fed into the new-type traction system 2. The far infrared heater 4 performs degreasing and sterilization on the reinforcement layer, and asynchronous production is operated under the driving of the guide piece 15. The reinforcement layer 18 is reserved in the reserved space of the new-type traction system 2 to ensure that the traction machine is operated at a constant traction speed for the production. The reinforcement layer 18 passes through the reinforcement layer inlet 12 in the combination module 5 into the traction machine, and the traction machine and the extruder are activated. The upper extruder 3 injects the inner coating into the lining material inlet 13 to apply on the inner side of the reinforcement layer 18, and the lower extruder 6 injects the outer coating into the outer layer material inlet 11 to apply on the outer side of the reinforcement layer 18. The speed is adjusted to obtain the required thickness of the inner layer and the outer layer.

(7) The hose, after being formed, is shaped by the cooling spray device, and is cut to a corresponding length according to the requirements.

The lining material of the product of the present embodiment is extruded by the upper extruder, and the material (BASF 1185A-10000) inside the upper extruder meets the drinking water standard. The outer layer material is extruded by the lower extruder, and the materials inside the lower extruder are the outer rubber granular material (Lubrizol 58315-036) and the color master batch (TEKNOR APEX-MBB1401). The reinforcement layer 18 is a tubular layer woven by warp and weft.

The product meets the National Sanitation Foundation (NSF) standard, certificate No. C0312740-01.

Embodiment 2

A method for preparing a compressible reinforced repair hose (PE-TPU material) includes the following steps:

(1) Drying, color blending, and mixing of the outer coating: The outer coating granular material linear low density polyethylene (LLDPE) and the color master batch (TEKNOR APEX-MBB1401) in the ratio of (100:(0-5)) are mixed in a mixer, and then fed into the dryer and dried at 70-110° C. for 1-6 hours.

(2) The inner coating granular material (BASF 1185A-10000) is employed to meet the drinking water standard, and is fed into the dryer and dried at 70-110° C. for 1-6 hours.

(3) Preparation of the reinforcement layer: The fiber layer process is designed, the reinforcement fibers are prepared, and the circular loom is tested for commissioning.

(4) Preparation of the mold: The extrusion mold is prepared according to the caliber and heated to a predetermined temperature of 170-240° C.

(5) Preparation for the extruder: The upper and lower extruder system performs preheating at a temperature of 150-240° C. for the next step.

(6) Preparation of the finished product: The circular loom 1 is activated to weave the reinforcement layer 18, and the reinforcement layer 18 is fed into the new-type traction system 2. The far infrared heater 4 performs degreasing and sterilization on the reinforcement layer, and asynchronous production is operated under the driving of the guide piece 15. The reinforcement layer 18 is reserved in the reserved space of the new-type traction system 2. The traction machine 8 and the extruder are activated. The reinforcement layer 18 passes through the reinforcement layer inlet 12 of the combination module 5. The upper extruder 3 injects the inner coating into the lining material inlet 13 to apply to the inner side of the reinforcement layer 18, and the lower extruder 6 injects the outer coating into the outer layer material inlet 11 to apply to the outer side of the reinforcement layer 18. The speed is adjusted to obtain the required thickness of the inner layer and the outer layer.

(7) The hose, after being formed, is shaped by the cooling spray device, and cut to a corresponding length according to the requirements.

The lining material of the product is extruded by the upper extruder, and the material (BASF 1185A-10000) inside the upper extruder meets the drinking water standard. The outer layer material is extruded by the lower extruder, and the materials inside the lower extruder are the outer rubber granular material linear low density polyethylene (LLDPE) and the color master batch (TEKNOR APEX-MBB1401). The reinforcement layer is a tubular layer woven by warp and weft.

Embodiment 3

A method for preparing a fracturing fluid delivery hose (PE-TPU adhesive/TPU material) for shale oil and gas includes the following steps:

(1) Drying, color blending, and mixing of the outer coating: The outer coating granular material linear low density polyethylene (LLDPE) and the color master batch (TEKNOR APEX-MBB1401) in the ratio of (100:(0-5)) are mixed in the mixer, and then fed into the dryer and dried at 70-110° C. for 1-6 hours.

(2) The inner coating granular material (BASF 1185A) is fed into the dryer and dried at 70-110° C. for 1-6 hours, and a TPU adhesive layer is applied between the inner coating and the reinforcement layer to increase the peel strength and meet the requirements for use.

(3) Preparation of the reinforcement layer: The fiber layer process is designed, the reinforcement fibers are prepared, and the circular loom is tested for commissioning.

(4) Preparation of the mold: The extrusion mold is prepared according to the caliber and is heated to a predetermined temperature of 170-240° C.

(5) Preparation for the extruder: The upper and lower extruder system performs preheating at a temperature of 150-240° C. for the next step.

(6) Preparation of the finished product: The circular loom 1 is activated to weave two reinforcement layers 18, and the reinforcement layer 18 is fed into the new-type traction system 2. The far infrared heater 4 performs degreasing and sterilization on the reinforcement layer, and asynchronous production is operated under the driving of the guide piece 15. The reinforcement layer 18 is reserved in the reserved space of the new-type traction system 2. The traction machine 8 and the extruder are activated. The reinforcement layer 18 passes through the reinforcement layer inlet 12 of the combination module 5. The upper extruder 3 injects the inner coating into the lining material inlet 13 to apply to the inner side of the reinforcement layer 18, and the lower extruder 6 injects the outer coating into the outer layer material inlet 11 to apply to the outer side of the reinforcement layer 18. The speed is adjusted to obtain the required thickness of the inner layer and the outer layer;

(7) The hose, after being formed, is shaped by the cooling spray device, and is cut to a corresponding length according to the requirements.

The lining material of the product is extruded by the upper extruder, and the material inside the upper extruder is the TPU adhesive/TPU (BASF 1185A). The outer material is extruded by the lower extruder, and the materials inside the lower extruder are the outer rubber granular material linear low density polyethylene (LLDPE) and the color master batch (TEKNOR APEX-MBB1401). The reinforcement layer is a tubular layer woven by warp and weft.

The technical solutions disclosed in the present invention are not limited to the technical means of the above-mentioned embodiments, but also include technical solutions consisting of any combination of the above-mentioned technical features.

What is claimed is:

1. A multi-layer continuous hose, comprising an outer coating, a reinforcement layer, and an inner coating, wherein the reinforcement layer is a tubular layer woven by a warp and a weft, and the reinforcement layer comprises two layers; the outer coating is arranged on an outside of the reinforcement layer, the inner coating is arranged on an inside of the reinforcement layer, and each of the outer coating and the inner coating comprises two layers and a material of the inner coating is different from a material of the outer coating, wherein the outer coating further comprises a color master batch, wherein a ratio of the material of the outer coating to the color master batch is 100 to 5.

2. The multi-layer continuous hose according to claim 1, wherein the material of the inner coating is TPU, and the material of the outer coating is flexible PE, or PA.

3. The multi-layer continuous hose according to claim 1, wherein each of the two layers of the reinforcement layer is a polyester fiber layer, or an aramid fiber layer.

4. The multi-layer continuous hose according to claim 1, wherein there is no coating material in a middle of the reinforcement layer.

5. The multi-layer continuous hose according to claim 1, wherein the multi-layer continuous hose is cut to a length according to a requirement.

6. A method for preparing a multi-layer continuous hose using a mold, an asynchronous production control and an L-shaped production line layout, comprising the following steps:

(1) performing the asynchronous production control between equipment of a production line;

(2) installing an internal and external combination mold;

(3) arranging the L-shaped production line layout;

(4) activating a circular loom and controlling a production speed to weave a reinforcement layer;
(5) feeding the reinforcement layer into a traction system through the mold, activating a traction machine, and then activating an upper extruder of an inner layer and a lower extruder of an outer layer after a steady cycle of the circular loom, and extruding a coating material of the inner layer and a coating material of the outer layer through the mold simultaneously, and adjusting an extrusion speed of the upper extruder and an extrusion speed of the lower extruder, respectively, to obtain a predetermined thickness of the inner layer and the outer layer; and
(6) after the multi-layer continuous hose is formed, shaping the multi-layer continuous hose by a cooling spray device, and cutting the multi-layer continuous hose to a predetermined length.

\* \* \* \* \*